July 22, 1930.  L. MARX  1,771,265
AUTOMOBILE RADIATOR ORNAMENT
Filed Dec. 28, 1927
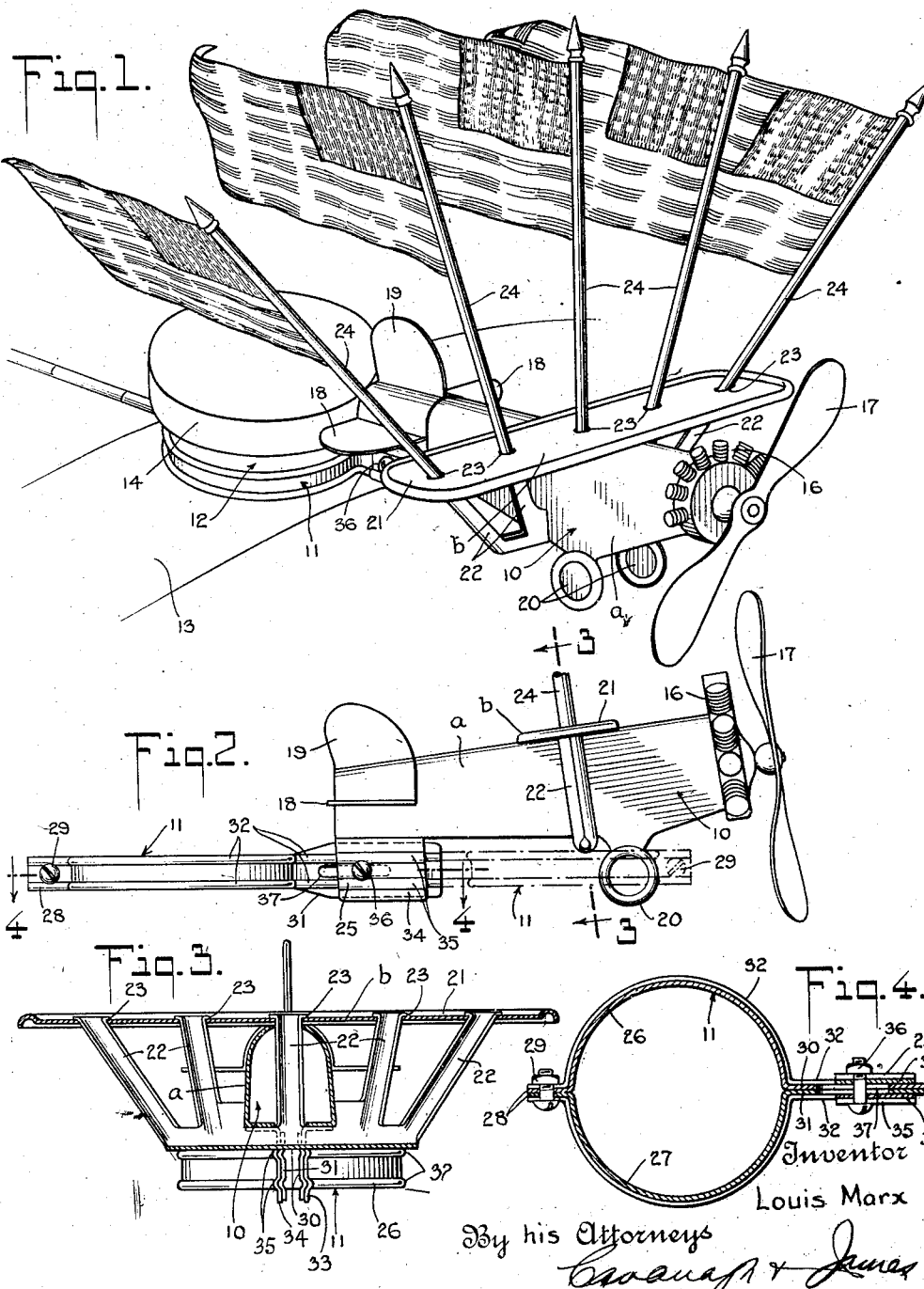
Inventor
Louis Marx
By his Attorneys Patented July 22, 1930

1,771,265

UNITED STATES PATENT OFFICE

LOUIS MARX, OF BROOKLYN, NEW YORK

AUTOMOBILE RADIATOR ORNAMENT

Application filed December 28, 1927. Serial No. 243,072.

This invention relates to an automobile radiator ornament, and has special reference to the provision of a combined ornament and flag holder for automobile radiators.

One of the prime objects of my present invention comprehends the provision of a combined ornament and flag holder for automobile radiators constructed and designed for use either as an ornament for everyday service or as a flag holder or support for use on special or festive occasions. The combined ornament and flag holder, designed as a simulated aircraft or airplane, embodies a construction which is utilizable as a complete and finished ornament for the radiator frame for continued use thereon, the ornament being quickly convertible into an embellished flag holder whenever the occasion demands.

A further prime object of the invention relates to the provision of an automobile radiator ornament and support therefor constructed and designed to permit the assembled ornament and support to be collapsed into relatively small confines for boxing and transportation purposes and to be opened up and assembled in supporting position with rapidity and ease.

Other and ancillary objects of the invention include the provision of a combined radiator ornament and flag holder of the nature referred to in which the parts are constructed and assembled to be manufactured and salable at a low cost.

To the accomplishment of the foregoing and such other objects as will hereinafter appear, my invention consists in the elements and their relation one to the other, as hereinafter more particularly described and sought to be defined in the claims, reference being had to the accompanying drawings which show the preferred embodiment of my invention, and in which:

Fig. 1 is a perspective view showing the combined ornament and flag holder attached to an automobile radiator frame, Fig. 2 is a side elevational view thereof and showing the collapsibility of the ornament construction, Fig. 3 is a view thereof taken in cross section in the plane of the line 3—3, Fig. 2, and Fig. 4 is a fragmentary view thereof taken in cross section in the plane of the line 4—4, Fig. 2.

Referring now more in detail to the drawings, the ornamental device is shown to comprise a simulated aircraft or airplane 10 and a support 11 therefor, the said support being detachably receivable by the nipple 12 of an automobile radiator frame 13, said nipple being normally closed by the radiator cap 14.

The simulated aircraft 10 is constructed and designed in accordance with the object of my present invention so as to be utilizable as an ornament per se and so as to be readily convertible into a flag holder or support on suitable festive occasions. To accomplish this, the aircraft device is constructed to comprise a fuselage body $a$ and a wing structure $b$, the said wing structure having incorporated therein means for detachably receiving a plurality of flags.

The fuselage body $a$ made of suitably stamped sheet material includes a simulated motor 16, a propeller 17 journaled frontally thereof, the tail planes 18 and a tail fin 19 attached rearwardly thereto, and a pair of simulated landing wheels 20, 20, all of which parts are preferably made of suitably stamped sheet metal designed to give a natural simulation of an airplane, the propeller 17 being loosely journaled so as to be wind propelled or rotated.

The wing structure $b$ comprises in its preferred form of construction a plate 21 attached to the fuselage body and simulating the wings of an airplane, said simulated wings being secured to the fuselage body $a$ by means of a plurality of bracing elements 22, 22 arranged preferably symmetrically on opposite sides of the median longitudinal plane of the aircraft body. These bracing elements 22, 22 are made to define tubular receptacles for receiving flagstaffs, and the wing plate 21 is provided with a plurality of orifices 23, 23 which register with the bores of the tubular elements 22, 22 and into which the flagstaffs are inserted, as is clearly apparent, for example, from a consideration of Figs. 1 and 3 of the drawings. Preferably the tops of the tubular elements 22, 22 are flanged over the apertures 23 in the plate 21, as is shown in Fig. 3 of the drawings.

It is a desideratum of the invention to so construct the aircraft ornament that the same may be made to serve as an ornament for everyday use, quickly convertible into a flag-holding use on festive occasions, this eliminating the need incident to the use of prior devices of this nature of repeatedly attaching and removing the flag holder or support from the radiator frame, depending upon its desired use. This is accomplished by the construction thus far described, since it will be apparent from a consideration, for example of Figs. 1 and 3 of the drawings, that the ornament is complete without the flagstaffs mounted thereon, the apertures 23, 23 being normally unnoticeable. Upon suitable occasion the ornament is converted into a combined ornament and flag holder by inserting the flagstaffs of the flags 24, 24, the flagstaffs being received by the tubular bracing elements 22, with a slip or friction fit, the flag-holding receptacles or elements 22, 22 being sufficiently long to support the flags stably and against accidental removal. The bracing elements 22, 22 are preferably arranged radiatingly transversely of the airplane body so that the flagstaffs, when mounted, are positioned in a flared or fan-like arrangement. Manifestly, at the end of a holiday, the flags may be removed by simply pulling the flagstaffs from their receptacles or sockets and leaving the ornament attached to the radiator frame.

As heretofore mentioned, a further object of the invention includes the provision of a supporting means for the radiator ornament designed and constructed to permit the assembly to be collapsed into relatively small confines for boxing and transportation purposes and adapted to be opened up and assembled for supporting position with rapidity and ease. To accomplish this the ornament 10 is pivotally or swivelly mounted on the supporting means 11 by means generally designated as 25, said means being constructed to permit the support 11 to be moved from an extended supporting position such as shown in full lines in Figs. 1 and 2 of the drawings to a collapsed condition shown in full lines in Fig. 3 and in dotted lines in Fig. 2 of the drawings, the support in its collapsed condition being folded under the fuselage body of the airplane ornament.

More specifically, the support 11 comprises a pair of twin sections 26 and 27 forming in assembled relation an annulus which fits over the neck of the nipple 12, the said sections being provided rearwardly with ears 28 which receive a securing bolt 29 and being provided frontally with a pair of extended arms 30 and 31. The arms 30 and 31 as well as the remaining portions of the support are provided with longitudinal ribs such as 32, 32 for a purpose presently to be described. The fuselage body $a$ is in turn provided with preferably a pair of depending fins 33 and 34 which are also longitudinally ribbed as at 35, the ribs 35 of the fins mating with the ribs 32 of the supporting fingers 30 and 31, the fingers being arranged to telescopically slide within the pair of fins 33 and 34, as will be clearly apparent from Figs. 2 and 4 of the drawings. These ribbed elements define interlocking means which are secured together to rigidly support the ornament 10 on the support 11 by means of a bolt 36, which bolt is received by slots 37 in the supporting arms 30 and 31 so as to permit extensible adjustment of the airplane body on the support.

By means of this last recited construction it will be seen that the bolt 36 provides a pivot or swivelling pin about which the support 11 is movable from the extended supporting position shown in full lines in Fig. 2 to a collapsed infolded position shown in dotted lines in Fig. 2 of the drawings. It will be further seen that a loosening of the bolt effects a loosening of the interlocking mating means between the support and the ornament, and conversely, a tightening of a single bolt effects an interlocking of the parts in any adjusted position.

The manner of making and using the automobile radiator ornament and flag holder of my present invention will, in the main, be fully apparent from the above detailed description thereof. It will be apparent that the ornament and support therefor may be boxed and purchased in a collapsed condition, and may be quickly mounted on a radiator frame by manipulation of the bolt 29 and by an adjustment and locking of the bolt 36 forming part of the adjusting means 25. It will be further seen that the ornament mounted for position on the radiator frame is always serviceable as such and may be quickly converted for use into a flag holder or support by simply inserting the plurality of flagstaffs 24, 24 into position in the receptacles provided therefor in the wing structure of the simulated airplane. Insertion and removal of the flagstaffs is effected by a quick slip-fit. It will be further obvious that the parts are so organized as to be producible and salable at a comparatiely low cost.

It will also be apparent that while I have shown and described my invention in the preferred form, many changes and modifications may be made in the structure disclosed without departing from the spirit of the invention, defined in the following claims.

I claim:

1. An automobile radiator ornament and flag holder comprising a simulated aircraft having a fuselage body and a wing structure, means for detachably attaching the simulated aircraft to an automobile radiator and a plurality of flag holding elements supported by said wing structure and arranged transversely of said fuselage body, the said flag holding elements being adapted for detachably receiving flag staffs.

2. An automobile radiator ornament and flag holder comprising a simulated aircraft having a fuselage body and a wing structure, means for detachably attaching the simulated aircraft to an automobile radiator, and a plurality of bracing elements connecting the wing structure with the fuselage body and arranged transversely thereof, the said bracing elements defining means for detachably receiving flag staffs.

3. An automobile radiator ornament and flag holder comprising a simulated aircraft having a fuselage body and a wing structure, means for detachably attaching the simulated aircraft to an automobile radiator, and bracing means connecting the wing structure with the fuselage body, said bracing means including a plurality of tubular flag holding elements arranged transversely of said fuselage body, the said tubular flag holding elements being adapted for detachably receiving flag staffs with a slip fit.

4. An automobile radiator ornament and flag holder comprising a simulated aircraft having a fuselage body and a wing structure, means for detachably attaching the simulated aircraft to an automobile radiator, and a plurality of elements incorporated in said wing structure and arranged radiatingly transversely of said fuselage body, for holding flag staffs, the plane of said wing structure being provided with orifices registering with said flag staff holding elements and adapted for the detachable insertion of flag staffs.

5. An automobile radiator ornament comprising an ornament and a support for the ornament for detachably attaching the same to an automobile radiator, means pivotally mounting the said ornament on said support whereby the support is movable from an extended supporting position to a collapsed inoperative position folded onto said ornament, and mating means on said support and ornament for interlocking the same to hold the ornament rigidly in its extended position on said support, the construction being such that a loosening of the mating interlocking means permits the pivotal motion between said support and ornament.

6. An automobile radiator ornament comprising an ornament and a support for the ornament for detachably attaching the same to an automobile radiator, threaded pivot pin means pivotally mounting the said ornament on said support whereby the support is movable from an extended supporting position to a collapsed inoperative position folded onto said ornament, and mating means on said support and ornament for interlocking the same to hold the ornament rigidly in its extended position on said support, the construction being such that a loosening of the threaded pivot pin means loosens the mating interlocking means and permits the pivotal motion between said support and ornament.

7. An automobile radiator ornament comprising an ornament and a support for the ornament for detachably attaching the same to an automobile radiator, means pivotally and slidably mounting the said ornament on said support whereby the support is movable from an extended supporting position to a collapsed position folded onto said ornament and whereby the ornament is longitudinally adjustable on the support, and mating means on said support and ornament for interlocking the same in any adjusted position to hold the ornament rigidly in its extended position on said support, the construction being such that a loosening of the mating interlocking means permits the pivotal motion between said support and ornament.

8. An automobile radiator ornament comprising an aircraft and flag holding ornament and a support for detachably attaching the ornament to an automobile radiator, means pivotally mounting the fuselage body of said ornament on said support whereby the support is movable from an extended supporting position to a collapsed position folded onto said ornament, and mating means on said support and fuselage body for interlocking the same to hold the ornament rigidly in its extended position on said support, the construction being such that a loosening of the mating interlocking means permits the pivotal motion between said support and ornament.

9. An automobile radiator ornament comprising an ornament and a support for the ornament for detachably attaching the same to an automobile radiator, pivot pin and slot means pivotally and longitudinally slidably mounting the said ornament on said support whereby the support is movable from an extended supporting position to a collapsed position folded onto said ornament and whereby the ornament is adjustable longitudinally of the support, and mating means on said support and ornament for adjustably interlocking the same to hold the ornament rigidly in any of its adjusted extended positions on said support.

10. An automobile radiator ornament comprising an ornament and a support for the ornament for detachably attaching the same to an automobile radiator, and means adjustably and pivotally mounting said ornament on said support, said means comprising a ribbed fin attached to said ornament and a ribbed arm attached to said support slidably mating and interlocking with said ribbed fin, and pivot pin means securing said arm and fin together, the construction being such that the loosening of such pivot pin means permits adjustment of said ornament on said support and a movement of said support relative to the ornament between an extended supporting position and a collapsed folded position.

11. An automobile radiator ornament comprising an ornament and a support for detachably attaching the same to an automobile radiator, and means adjustably and pivotally mounting said ornament on said support, said means comprising a pair of ribbed fins attached to said ornament and a pair of ribbed arms attached to said support telescopically mating and interlocking with said ribbed fins, and pivot pin and slot means securing said arms and fins together, the construction being such that the loosening of the pivot pin permits telescopic adjustment of said ornament on said support and a pivotal movement of said support relative to the ornament between an extended supporting position and a collapsed folded position.

12. An automobile radiator ornament as set forth in claim 1, in which the means for detachably attaching the aircraft to an automobile radiator comprises a support, a means adjustably and pivotally mounting said aircraft on said support, said last mentioned means comprising a ribbed fin attached to said aircraft body and a ribbed arm attached to said support slidably mating and interlocking with said ribbed fin and pivot pin means securing said finger and fin together, the construction being such that the loosening of such pivot pin permits adjustment of said aircraft body on said support and a movement of said support relative to said body between an extended supporting position and a collapsed folded position.

Signed at New York in the county of New York and State of New York this 27th day of December, A. D. 1927.

LOUIS MARX.